D. W. TRAVIS.
Ditching-Machines.
No. 146,725. Patented Jan. 20, 1874.
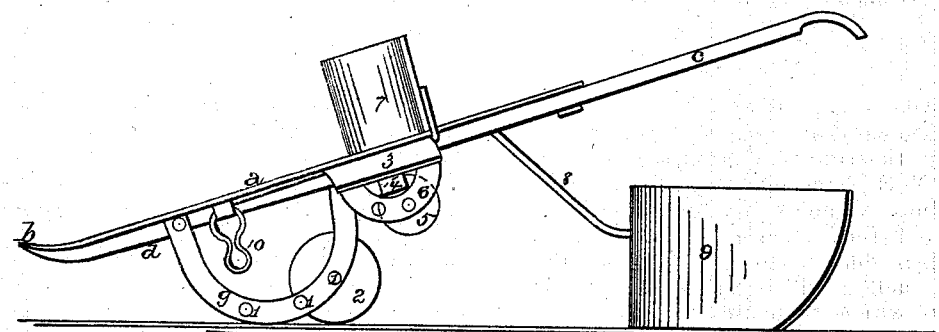
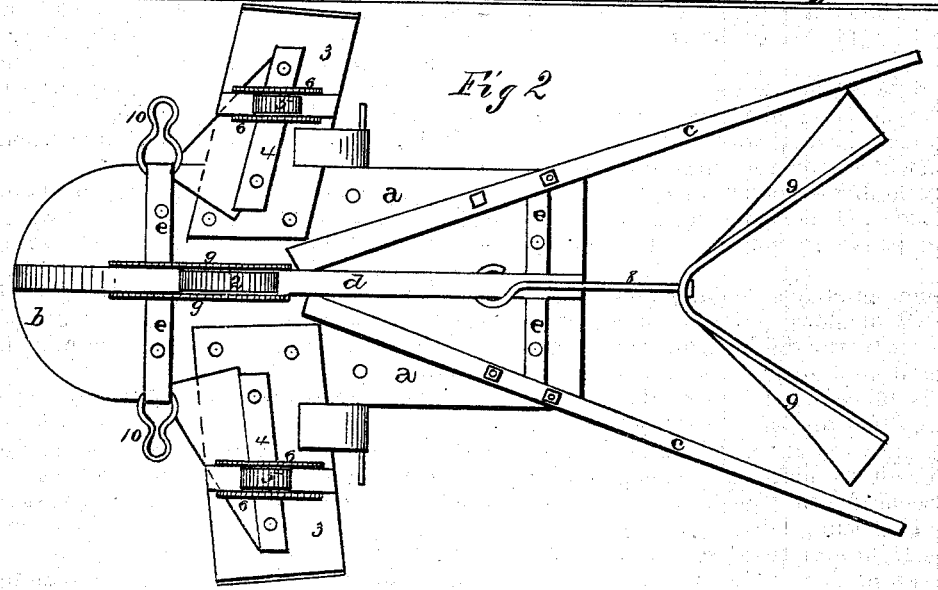

UNITED STATES PATENT OFFICE.

DUDLEY W. TRAVIS, OF ITHACA, NEW YORK.

IMPROVEMENT IN DITCHING-MACHINES.

Specification forming part of Letters Patent No. 146,725, dated January 20, 1874; application filed October 10, 1873.

*To all whom it may concern:*

Be it known that I, DUDLEY W. TRAVIS, of Ithaca, in the county of Tompkins and State of New York, have invented certain new and useful Improvements in Ditching-Machines; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in ditching-machines; and it consists in the arrangement and combination of parts, which will be more fully described hereafter, whereby the dirt is scooped out of the furrow cut by the plow and deposited upon each side.

The accompanying drawings represent my invention.

$a$ represents an oblong metallic plate, having a rounded or sharp point, $b$, for entering the furrow cut by the ditching-plow, and having two handles, $c$, secured to its rear end. This plate is braced on its under side its entire length by the iron bar $d$, having the arms $e$ extending outward at right angles from it, so as to prevent the plate from being bent or broken. Secured near the front end of this bar are the two bent plates $g$, having a number of holes, 1, through them, so that the roller or wheel 2 can be moved forward or back, to regulate the pitch at which the point shall enter the furrow. Extending outward from each side of the plate $a$ are the two arms 3, which consist of plates of suitable width, which conduct the earth from the furrow outward, and deposit it along the sides. These plates are braced on their under sides by the cruciform bars 4, and have a friction-roller, 5, secured in the curved plates 6, which can be adjusted to suit the pitch of the plate $a$. Secured to the top of the plate $a$ is the curved plate 7, which is pointed in the center, so as to divide the earth as it rises from the furrow, and guide it outward to the arms or wings 3. Fastened near the rear end of the bar $d$, by means of the connecting-rod 8, is a scraper, 9, of any suitable shape, which scrapes or pushes the dirt, as it falls from the wings, away from the edges of the ditch. The draft for drawing the machine is fastened at the points 10.

Having thus described my invention, I claim—

1. A machine for cleaning out the furrows made by the ditching-plow, consisting of a pointed plate, $a$, provided with operating-handles $c$, substantially as set forth.

2. The pointed plate $a$, for cleaning out the furrows made by the ditching-plow, provided with the adjustable roller 2, substantially as specified.

3. The pointed plate $a$, for cleaning out the furrows of ditching-plows, provided with the wings 3 and guide 7, substantially as described.

4. The pointed plate $a$, provided with the roller 2, wings 3, guide 7, and suitable strengthening-bars, in combination with the scraper 9, substantially as shown.

In testimony that I claim the foregoing I have hereunto set my hand this 9th day of October, 1873.

D. W. TRAVIS.

Witnesses:
F. A. LEHMANN,
WM. HALE.